United States Patent [19]
Lindley

[11] 3,806,937
[45] Apr. 23, 1974

[54] AUTOMATIC DIRECTION FINDING SYSTEM UTILIZING DIGITAL TECHNIQUES

[75] Inventor: Dale C. Lindley, Cupertino, Calif.

[73] Assignee: ESL, Inc.

[22] Filed: Apr. 24, 1972

[21] Appl. No.: 246,536

[52] U.S. Cl. .......................... 343/117 A, 324/83 FE
[51] Int. Cl. ................................................ G01s 3/48
[58] Field of Search .......... 343/117 A; 324/188, 84, 324/83 A, 83 FE

[56] References Cited

UNITED STATES PATENTS

| | | | |
|---|---|---|---|
| 3,140,490 | 7/1964 | Sichak et al. | 343/117 A |
| 3,221,251 | 11/1965 | Margerum et al. | 324/84 |

OTHER PUBLICATIONS

I.R.E. Transactions on Aeronautical and Navigational Electronics, Vol. Ane 3, No. 2, June 1956, pp. 67–70.

*Primary Examiner*—Maynard R. Wilbur
*Assistant Examiner*—Richard E. Berger
*Attorney, Agent, or Firm*—Limbach, Limbach & Sutton

[57] ABSTRACT

Radio frequency signals received by two antennas positioned a fixed distance apart are passed through individual delay lines, one having a fixed time delay and the other having a variable time delay. The two signal outputs of the delay lines are combined into a composite signal that is modulated according to the phase difference between the delay line output signals. The composite signal is applied to a radio receiver and an amplitude modulation detector output of the radio receiver is processed to generate an error signal proportional to the magnitude and sense of the amount of composite signal modulation. The error signal automatically adjusts the variable delay line until the error signal itself is minimized, the case where the phase of the signals of the outputs of the delay circuits are equal. Under this condition, the difference in time delay between the fixed delay circuit and the adjustable delay circuit is equal to the difference in time of arrival of the radio wave at the two antennas from which the direction of a transmitter of the radio frequency signal is determined.

27 Claims, 27 Drawing Figures

A. B. C.

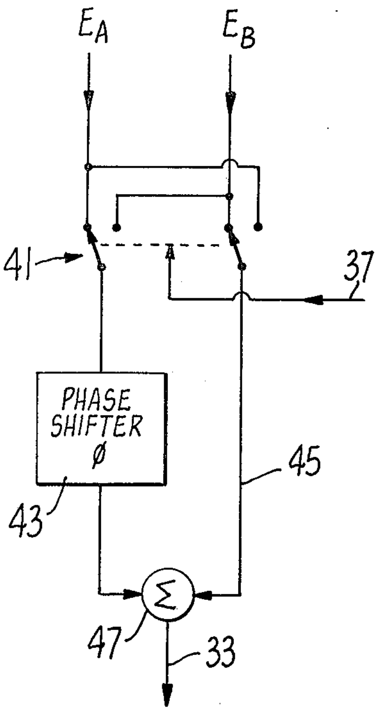
FIG. 2.
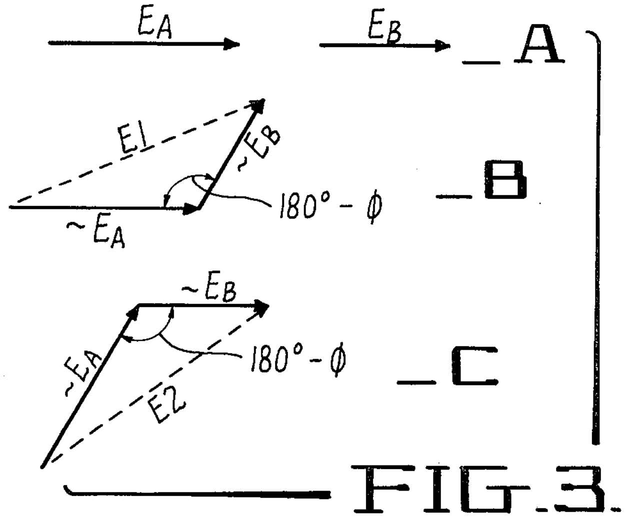
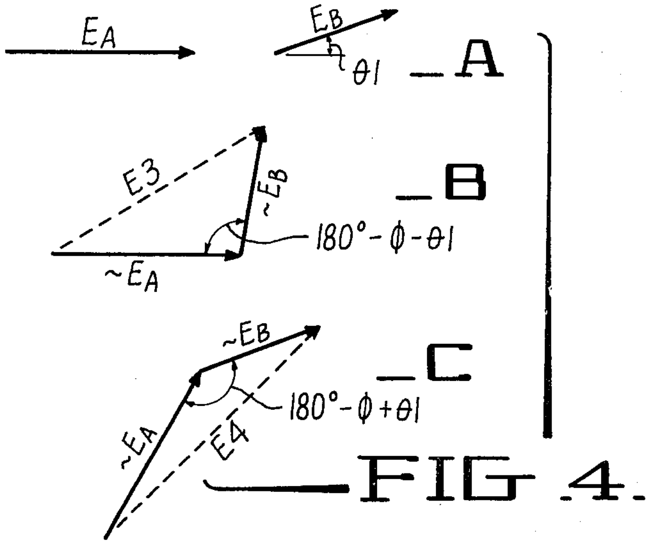
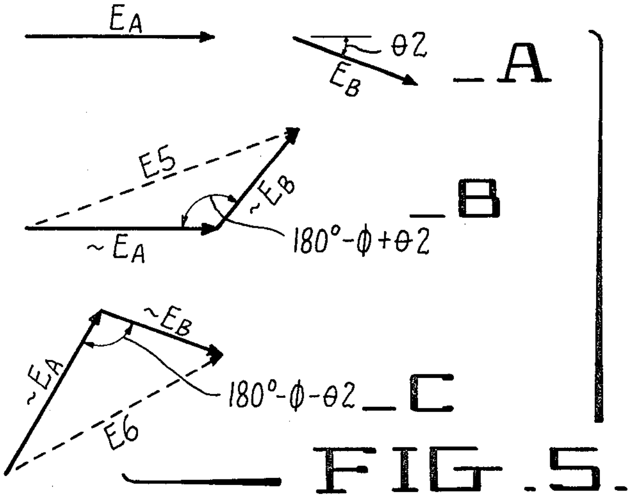

AUTOMATIC DIRECTION FINDING SYSTEM UTILIZING DIGITAL TECHNIQUES

BACKGROUND OF THE INVENTION

The present invention is related generally to direction finding systems and more specifically to systems for determining the bearing angle of a radio transmitter.

The needs for determining the location of a radio transmitter are varied. A boat, for instance, may have an emergency constant frequency transmitter and search parties want to be able to pinpoint the transmitter's location in order to effect a rescue. One way of determining the bearing angle of the radio transmitter relative to an observer is to measure the very small time difference between the arrival of the radio frequency wavefront at one antenna and its arrival at another antenna. The antennas are held a fixed distance from one another. The angle of arrival of the radio wavefront is related to the measured time of arrival by an inverse sine function. There have been several previous approaches to the measurement of this time of arrival difference.

One approach is to directly measure the relative phase difference between signals generated in each of the two antennas. A two channel receiver is utilized, one channel for each antenna. A phase detector is connected at the receiver outputs. The relative phase difference is converted to a time of arrival difference by knowing the frequency to which the receiver is tuned. A disadvantage of this approach is that the two receiver channels need to be very accurately matched in phase and amplitude characteristics. Antenna amplitude imbalance also affects the reading.

Another approach has been to convert a relative phase difference in the signals received by the two antennas into a signal amplitude difference, thereby requiring only one radio receiving channel. The signal amplitude difference is then measured. A difficulty with this approach is again that the measured amplitude difference also reflects imbalances in gain and amplitudes between the antennas.

Yet another approach is the use of a fixed delay line in the electrical circuit from one antenna and a variable delay line in the electrical circuit from a second antenna. A subtracting circuit compares the relative phases of the signals at the outputs of the delay lines. The variable delay line is then adjusted in delay time until a null occurs at the output. When this happens, the difference in delay time between the fixed delay line and the variable delay line is equal to the difference in time of arrival of the radio signal at the two antennas. This technique is, however, vulnerable to amplitude imbalances in the antennas since the null obtained at the output of the delay lines is also a function of signal amplitude. Also, the nulling technique reduces the signal available for a receiver, thus not permitting the operator to listen to the radio signal at the same time that the time delay adjustments are being made.

Therefore, it is a primary object of the present invention to provide a radio frequency bearing angle measuring technique that is insensitive to differences in amplitudes between a pair of antenna circuits.

Another object of the present invention is to provide a radio frequency bearing angle measuring technique that permits continuous monitoring of the radio signal simultaneously with the bearing angle measurement being taken.

Yet another object of the present invention is to provide a radio frequency bearing angle measuring technique that is independent of the measured frequency.

Still another object of the present invention is to provide a radio frequency bearing angle measuring technique that is automatic.

A further object of the present invention is to provide a radio frequency bearing angle measuring apparatus as an economical add-on to a single existing radio receiver.

SUMMARY OF THE INVENTION

These and additional objects are realized according to the present invention by the use of a fixed delay line connected to one antenna and an adjustable delay line connected to the other antenna, and means for producing a combined radio frequency signal from the two antennas that is modulated to a degree and with a sense according to the phase difference in the signal outputs of the delay lines. This modulation may be, for instance, of the frequency, amplitude or phase type. A circuit responsive to the composite signal generates an error signal proportional in magnitude and sense to the magnitude and sense of the composite signal modulation. The adjustable time delay circuit is made to have a longer or shorter delay in response to the error signal by automatic means which operates to minimize the error signal. The difference in time between the fixed delay circuit and the adjustable delay circuit is the desired time of arrival difference of the received radio signal from which the bearing angle can be calculated.

The result of such a direction finding system is that the time of arrival of a given signal as directly measured is independent of its frequency. The adjustable delay line is quickly and automatically adjusted in response to receipt of a radio signal. This permits detection of a bearing angle of the path of a radio signal even if it is intermittent or on for only a short time.

Combination of the two signal outputs of the delay lines in a manner to produce a single amplitude modulated signal is accomplished, according to one form of the invention, by a phase shifting circuit and a switching circuit. The single composite signal is alternated at a rate below the audio range between one delay line output signal plus the other after phase shifting and the other delay line output signal plus the one after phase shifting. The phase shifting is maintained at a fixed value, preferably 90° or less. The amplitude modulation of the composite signal goes to zero when the output signals of the delay lines are in phase, the desired equilibrium condition. At this equilibrium point, the difference in delay time of the delay lines is the desired time of arrival difference of the radio wavefront at the two antennas. This time quantity is insensitive to amplitude differences of the output signals of the delay line.

The desired radio signal is selected from all those signals striking the antenna by means of some convenient tunable device. One such device is an ordinary radio receiver to which the remaining portions of the direction finding system are a supplement. The composite amplitude modulated signal is applied to the radio receiver and its automatic gain control output (or some other signal proportional to radio frequency power input) is utilized to produce the error signal which causes automatic adjustment of the variable delay line. By this technique, the operator may listen through his receiver to the radio signal simultaneously with the system automatically reading the time of arrival difference of the radio signal at two spatially fixed antennas. The system is tunable to a desired frequency just as fast as the operator can tune an ordinary radio receiver. No operator action is required to cause adjustment of the variable delay line other than normal receiver adjustment functions. Only one ordinary single channel radio receiver is required. The direction finding add-on is all electronic with no moving parts.

Additional objects and advantages of the present invention are presented in the accompanying detailed description which is to be taken in conjunction with the accompanying drawings.

BRIEF DESCRIPTION OF THE DRAWINGS

FIG. 2 is a diagram of one form of the signal combiner and modulator block of FIG. 1;

FIGS. 3A–C, 4A–C and 5A–C illustrate by vector diagrams the operation of the signal combiner and modulator of FIG. 2;

DESCRIPTION OF THE PREFERRED EMBODIMENTS

Figure 1:
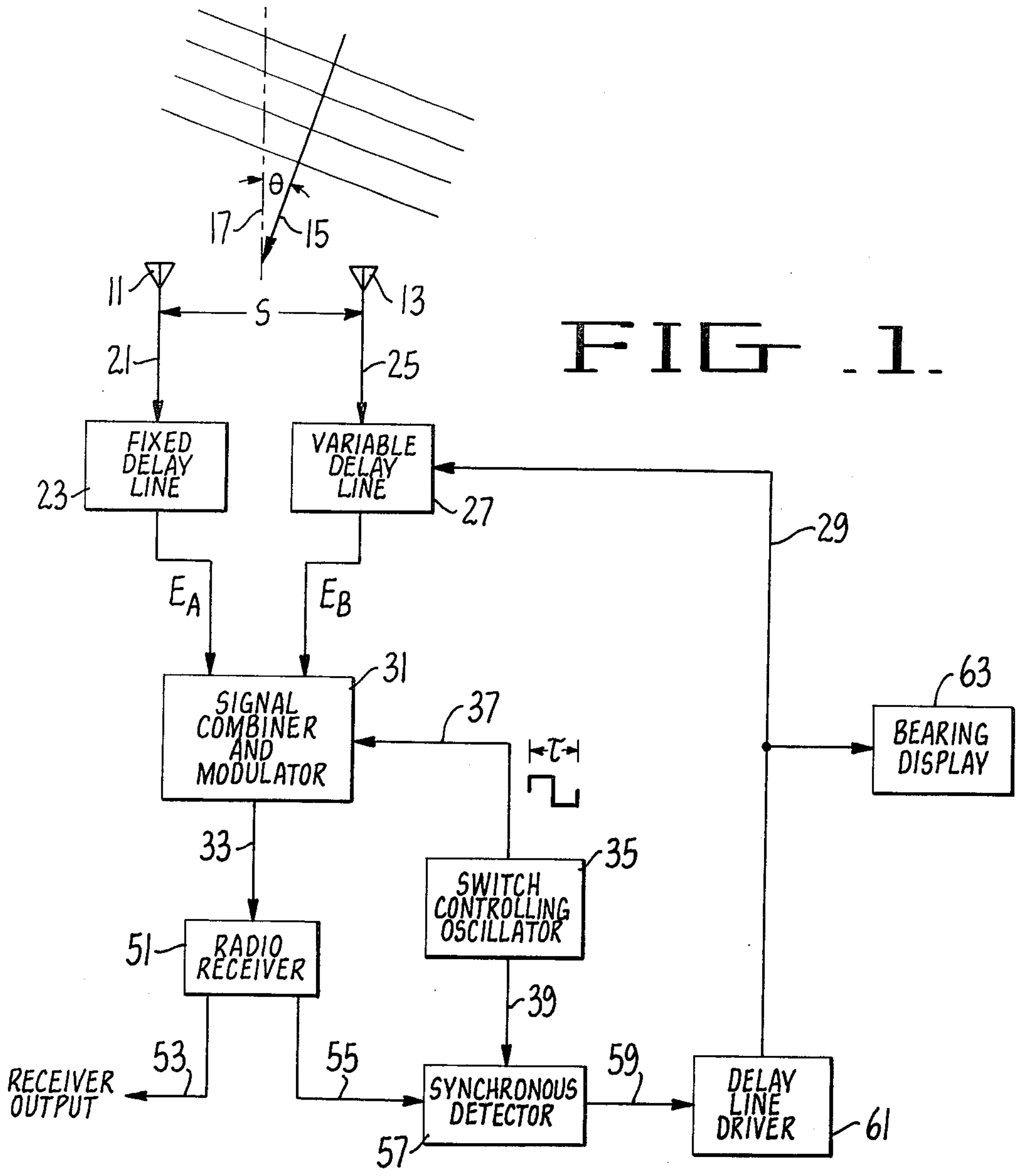
FIG. 1 is a block diagram of a direction finding system according to the techniques of the present invention.

Referring to FIG. 1, a pair of antennas 11 and 13 are fixed in space a distance S from each other. An electromagnetic wavefront 15, which may be in the radio frequency portion of the spectrum, is propagating onto the antennas 11 and 13. Because the wavefront 15 is propagating in a direction making an angle $\theta$ with a line 17 that is perpendicular to a line joining the antennas 11 and 13, the wavefront will strike the two antennas at different times. The angle $\theta$ is the desired bearing angle of the electromagnetic energy wavefront 15, the quantity desired to be determined in order to discover the source of the wavefront such as the position of the radio frequency transmitter. The bearing angle $\theta$ is related to a difference in $t$ Δt of arrival of the wavefront of the two antennas 11 and 13 by the following well known interferometric equation wherein c is the velocity of propagation of the wavefront:

$$\theta = \arcsin\ [c\Delta t/S] \tag{1}$$

The difference of arrival $\Delta t$ is normally very short. The distance S between the antennas 11 and 13 is normally only a very few feet for signals in the VHF frequency range. Therefore, the technique for measuring $\Delta t$ must be extremely accurate in order to allow determination of the bearing angle $\theta$ with some degree of precision.

Virtually any type of antenna may be used for the antennas 11 and 13 depending upon the electromagnetic energy frequency range of interest and other factors. Monopoles, dipoles, bow-tie dipoles, Yagi-Uda arrays and sleeve dipoles are examples of types of antennas that may be used. The signal received at the antenna 11 is applied by an appropriate transmission line 21 to a fixed delay line 23. Similarly, the signal developed by the antenna 13 is communicated by a suitable transmission line 25 to a variable delay line 27. The delay lines 23 and 27 may be any element which produces at its output a signal similar to that applied to its input but which is delayed a controlled period of time. This delay time is fixed in the delay line 23 at some value and is made variable in the delay line 27 through a range of values below and above the time delay of the fixed delay line 23. The delay lines 23 and 27 preferably include a passive transmission line segment and can utilize microstrip, strip line, coaxial or a loaded transmission line segment. The variable delay line 27 preferably includes a set of passive transmission line segments that are switched together through various different periods of total delay in response to a signal in a line 29.

The output of the fixed delay line 23 is a delayed electrical signal $E_A$ which is, of course, in the radio frequency range if the wavefront 15 of interest is in the radio frequency range. Similarly, the output of the variable delay line 27 is a delayed electrical signal $E_B$. The signals $E_A$ and $E_B$ are applied to a circuit 31 for combination and modulation in a manner to generate a single radio frequency signal at its output line 33. The output signal 33 is a composite of the delayed signals $E_A$ and $E_B$ and contains a modulation that is related to the relative phases of the delayed signals $E_A$ and $E_B$. When the delayed signals $E_A$ and $E_B$ are made to come into phase by proper adjustment of the variable delay line 27, the modulation in the composite signal 33 is minimized and preferably is zero. The modulation of the composite signal 33 is detected as to its sense and magnitude by other blocks of the configuration of FIG. 1 in order to generate a signal in the line 29 which automatically causes adjustment of the variable delay line 27 to bring the delayed signals $E_A$ and $E_B$ into phase. This is accomplished by a closed feedback loop.

When there is zero modulation in the composite signal of the line 33, the delayed signals $E_A$ and $E_B$ are in phase. The difference in time delay between that of the fixed delay line 23 and the variable delay line 27 at that particular adjustment is thus the quantity Δt which is desired for calculation of the bearing angle $\theta$ according to the standard interferometric equation (1) recited above. It is preferable to check for phase coincidence of the delayed signals $E_A$ and $E_B$ rather than directly measuring a phase difference between them when working with very small time differences. Furthermore, the technique of checking for phase coincidence of the signals $E_A$ and $E_B$ makes the determination of $\Delta t$ independent of the relative amplitudes of the signals $E_A$ and $E_B$, as will be explained further hereinafter.

In the specific embodiments described herein with respect to the drawings, the type of modulation provided of the composite radio frequency signal 33 is of the amplitude type. The amplitude modulation within the block 31 of FIG. 1 is provided by a switch controlling oscillator 35 through a line 37. In the embodiments described herein, the oscillator 35 is of a type generating a square wave signal in the line 37 and a second output line 39. The square wave is at a constant frequency preferably below the audio range of information which may be contained in a radio frequency signal that is being monitored. Thus, the square wave modulating frequency in the lines 37 and 39 is held to less than about 100 Hz. With this low modulating frequency, the effect on the information contained in the composite radio signal 33 is thus minimized.

One form of the amplitude modulator and combiner 31 of FIG. 1 is illustrated in FIG. 2. A double pole, double throw switch 41 is controlled by the square wave signal in the line 37 between its two positions. A phase shifting circuit 43 is provided to shift one of the signals $E_A$ or $E_B$ by a fixed amount $\phi$, depending upon the position of the switch 41. The output of the phase shifting circuit 43 and one of the signals $E_A$ or $E_B$ through a line 45 are combined by a summing circuit 47 to produce the composite modulated radio frequency signal in the output line 33.

The switch 41 of FIG. 2 is preferably a semiconductor type of switch that is thrown into one position of the other depending upon the signal level at a given instant of the square wave in the line 37. It will be noted that the switch 41 is wired to be a reversing switch. When in one position, that as shown in FIG. 2, the signal $E_A$ is applied to the phase shifting circuit 43 while the signal $E_B$ is carried by the line 45. When the switch 41 is in its other position, the signal $E_B$ is applied to the phase shifting circuit while the signal $E_A$ is connected through the line 45. Thus, the composite signal output of the summation circuit 47 in the line 33 alternates between a combination of the delayed signals $E_A$ and $E_B$ wherein one of the signals is phase shifted by an amount $\phi$ and then the other signal is shifted by an amount $\phi$.

The combining and modulating functions of a circuit represented in FIG. 2 may best be understood by referring to vector diagrams FIGS. 3–5. First considering FIG. *3a*, vectors representing $E_A$ and $E_B$ are shown to be in phase coincidence but to have different amplitudes. This is the desired case of phase coincidence wherein the variable delay line of FIG. 1 has been adjusted to minimize the feedback error signal and permits the determination directly of the desired quantity $\Delta t$. When the switch 41 is thrown to the opposite position of that shown in FIG. 2, the composite signal 33 may be expressed as a vector E1 as illustrated in FIG. *3b*. The signal $E_A$ is passed to the summing circuit 47 through the line 45 without any phase shift. The signal $E_B$ is added thereto by the summing circuit 47 but only after having undergone a shift in phase an amount $\phi$.

When the switch 41 of FIG. 2 is in the position shown in FIG. 2, the composite signal 33 may be expressed as a vector E2 as shown in FIG. *3c*. The vector E2 is a summation of the delayed signal $E_A$, after being phase shifted an amount $\phi$, and the delayed signal $E_B$ with no phase shift. Thus the composite signal 33 is alternately switched between the signal E1 and the signal E2 by operation of the square wave switching signal in the line 37 which drives the switch 41. It will be noted from the geometry of the vector diagrams of FIG. 3 that the magnitude of the signals E1 and E2 are equal. Therefore, the radio frequency signal output at 33 has zero amplitude modulation, as shown in FIG. *6a*, when the delayed signals $E_A$ and $E_B$ are of the same relative phase regardless of their relative magnitudes.

Referring to FIG. 4, a different condition is illustrated wherein the delayed signals $E_A$ and $E_B$ are out of phase with one another, the delayed signal $E_B$ leading the delayed signal $E_A$ by a phase angle $\theta 1$. These signals are shown in FIG. *4a*. FIG. *4b* shows the signal 33 to have a level E3 when the switch 41 is in its position opposite to that shown in FIG. 2. The signal $E_A$ is added without phase shift to the signal $E_B$ which has been shifted by the phase shifting network 43 an amount $\phi$. When the switch 41 is in its other position, the position shown in FIG. 2, FIG. *4c* shows the composite signal output E4 in the line 33. It will be noted that the resultants E3 and E4 are of different magnitudes because the angles at which they are added in FIGS. *4b* and *4c* differ by an amount related to $\theta 1$, the phase difference between the delayed signals $E_A$ and $E_B$. The magnitude of E3 is less than the magnitude of E4. Thus, as the switch 41 is moved between its two positions in response to the square wave signal in the line 37 of FIG. 2, the composite radio frequency signal output at 33 repetitively shifts between the different voltage levels E3 and E4 as shown by the radio frequency envelope waveform of FIG. 6b.

The period $\tau$ of the amplitude modulated composite radio frequency signal in the line 33 is the same period as the square wave in the line 37 which operates the switch 41. In this situation, the difference in voltage $\Delta V_B$ of the amplitude modulated composite signal at 33, as shown in FIG. 6b, is utilized to generate an error signal for adjusting the variable delay line 27 in order to drive $\Delta V_B$ to zero, the desired end result shown in FIG. 6a according to the vector diagrams of FIG. 3.

FIG. 5a shows another case where the delayed signals $E_A$ and $E_B$ are out of phase, the signal $E_B$ trailing the signal $E_A$ by an amount $\theta 2$. FIG. *5b* is a vector diagram showing the operation of the circuit of FIG. 2 when the switch 41 is in the position opposite to that shown, thus developing a signal E5 at the output 33 of the summer 47. FIG. *5c* shows the operation of the circuit of FIG. 2 when the switch 41 is in the position shown, thereby to develop a signal E6 of FIG. *5c* at the output 33 of FIG. 2. FIG. *6c* shows the amplitude modualted composite radio frequency signal at the lines 33 under the circumstances shown in FIG. 5. In FIG. *6c* it will be seen that the radio frequency signal output at 33 varies between the higher level E5 and the lower level E6, thus developing a voltage differential $\Delta V_C$ which is used, as discussed hereinafter, to adjust the variable delay line 27 to cause $\Delta V_C$ to go to zero and restore the circuit to the desired state illustrated by the vectors of FIG. 3 and the composite signal output of FIG. *6a*.

The vector diagrams of FIG. 4 along with the resultant composite signal amplitude modulation shown in FIG. *6b* may be compared, on one hand, with the vector diagrams of FIG. 5 and the resultant amplitude modualtion of the composite signal as shown in FIG. *6c*. When the switch 41 is in the position opposite to that shown in FIG. 2, the composite signal amplitude of FIG. *6c* (E5) is in the higher of its two states while in the case of FIG. *6b* (E3) the composite signal is in the lower of its two states. Conversely, when the switch 41 is in its other position, the one shown in FIG. 2, the composite signal output of FIG. *6b* (E4) is in the higher of its two states while the composite signal of FIG. *6c* (E6) is in the lower of its two states. Therefore, it can be seen that the amplitude modulation of the composite radio frequency signal in the line 33 contains information not only as to the magnitude of the phase difference between the delayed signals $E_A$ and $E_B$, but also contains information as to the sense (sign) of the phase difference. That is, whether the delayed signal $E_B$ leads or lags in relative phase behind the delayed signal $E_A$ can be determined from the amplitude modulated composite signal in the line 33 by observing whether the signal at 33 is at its highest or lowest level when the switch 41 of FIG. 2 is in a given position. This information in the amplitude modulated composite signal in the line 33 is used, as is explained hereinafter, to adjust the variable delay line 27 in the proper direction to minimize or eliminate the amplitude modulation of the composite signal.

Figure 6:
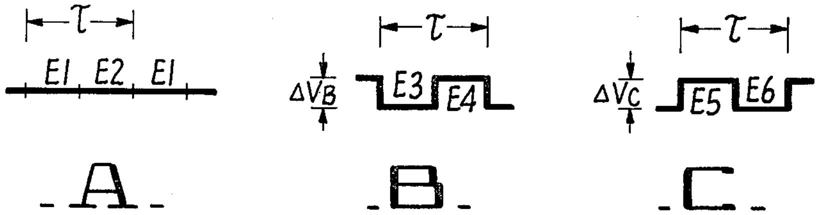
FIG. 6A–C illustrates the voltage output of the signal combiner and modulator circuit of FIG. 2.

In a utilization of the direction finder system of FIG. 1, there will be, of course, a large number of electromagnetic energy wavefronts of differing frequencies that strike the antennas 11 and 13. Generally, one one of these is of interest or at least only one is desired to be investigated at one time. Accordingly, some frequency selection and detection must ordinarily be accomplished. Known tuners can be used in the path of the composite signal in the line 33 to select out that radio frequency signal of interest. Most conveniently, an ordinary radio receiver 51 is utilized with the line 33 connected to its antenna terminal. The radio receiver then operates in a normal manner with a receiver output 53 available to an operator for monitoring the information content of a radio frequency signal of interest simultaneously with its bearing angle being determined automatically. A signal is developed in a line 55 that is proportional to the radio frequency power of the selected frequency. Most conveniently, this is the output of an automatic gain control circuit in the radio receiver 51. The signal in the line 55 then rises and falls according to the envelope of amplitude modulation of the composite signal in the line 33 as shown in FIG. 6.

A synchronous detector 57 is a rectifying device that generates an output in a line 59 in the form of a direct current signal that may go both positive and negative. The magnitude of the output signal is proportional to the level of the alternating current signal input in the line 55 that is of the same frequency as the switching oscillator output in the line 39. Where the composite signal 33 is amplitude modulated in a manner shown in FIG. 6*b*, the output of the synchronous detector 57 will be voltage proportional to $\Delta V_B$. If this voltage is positive, then the output voltage at the line 49 will be negative an amount proportional to the voltage$\Delta V_C$ when the amplitude modulation of the composite signal 33 is of the type shown in FIG. 6*c*. Thus, the direct current level at the output 59 is proportional to the phase difference between the delayed signals $E_A$ and $E_B$ and is positive or negative depending upon whether the signal $E_B$ leads or lags in relative phase the signal $E_A$. This signal in the line 59 is usually dependent on the relative amplitude differences in the signals $E_A$ and $E_B$ as well as their relative phases. However, when the signals $E_A$ and $E_B$ are in phase with each other, the direct current signal in the line 59 is zero, independent of these amplitude differences.

The signal in the line 59 is used to control a delay line driver 61 which, in the preferred embodiment, is a digital binary up/down counter. The output line 29 of the delay line driver 61 preferably contains in binary form a signal that is increasing or decreasing according to the sense of the direct current level in the line 59. The rate of increase or decrease is proportional to the magnitude of the signal in line 59. When the direct current signal in line 59 is equal to zero, the up/down counter is stationary. The binary coded signal in the line 29 thus determines the period of time delay to which the variable time delay line 27 is set. A bearing display 63 monitors the binary count in the line 29 in a manner to tell the operator the period of time delay to which the variable delay line 27 is set. The bearing display 63 most simply may form a direct readout of the variable delay line setting in binary form. The operator may then convert this into the desired bearing angle by an appropriate chart or graph. Other possibilities for the display 63 include a non-linear digital to analog converter to produce a direct display of the bearing angle $\theta$ from the binary count in the line 29. A further possibility is to use a small digital computer to convert the binary count in the line 29 into a bearing angle $\theta$ directly. Use of a computer also permits rapid statistical manipulation of the data to reduce the effects of noise in the system and also to add correction factors to compensate for imperfections in the antenna phase characteristics and other component errors.

Figure 7:
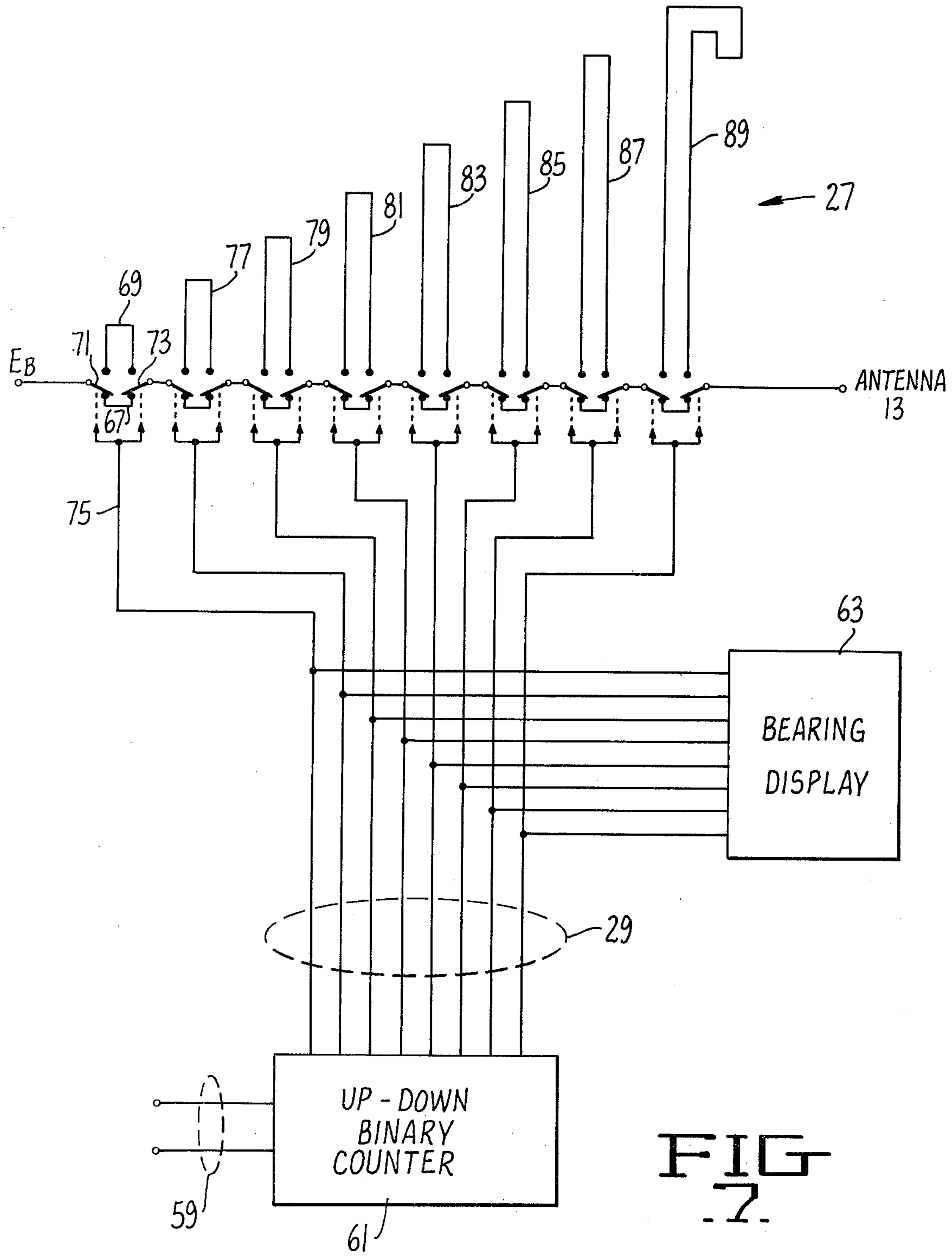
FIG. 7 illustrates one form of the delay line driver and variable delay line blocks of FIG. 1.

Referring to FIG. 7, the control of the variable delay line 27 of FIG. 1 is shown in one of several possible specific forms. The binary counter 61 is shown to be an eight bit up/down counter and is driven by the D.C. level input at 59 that is proportional to the magnitude and sense of the amplitude modulation of the composite radio frequency signal. The bearing display 63 is connected to read the binary count output in the eight individual lines of the output 29. The binary count in the eight individual lines of the output 29 is also used to switch together delay lines segments of varying lengths as part of the variable delay line 27 to complete a feedback loop. The specific digital delay line shown in FIG. 7 includes a plurality of passive transmission lines segments whose lengths are related in a binary manner and which are combined together by semiconductor switching elements such as PIN switching diodes.

The specific variable delay line 27 shown in FIG. 7 includes eight sections of which a section 65 is typical. The section 65 includes a delay line segment 67 and a delay line segment 69 with a pair of switches 71 and 73 for selecting which of the delay lines 67 and 69 will be connected between the antenna 13 and the signal combiner 31 of FIG. 1. Both of the switches 71 and 73 are driven together by one of the binary lines 75 from the counter 61 within the output 29 thereof. The switches 71 and 73 are, of course, preferably semi-conductor devices and the delay line segments 67 and 69 may most easily be formed on a printed circuit board and are of unequal length.

The other seven sections of the delay line 27 include one segment having the same length, and thus the same time delay, as the segment 67 of the section 65. The remaining seven delay line segments 77, 79, 81, 83, 85, 87 and 89, one in each of the remaining seven sections of the delay line 27, are of unequal lengths and are unequal to the length of the delay line segment 59. The eight segments 69 and 77–89 have lengths that are related in a binary manner. The fixed delay line 23 of FIG. 1 preferably has a delay time substantially equal to that of the delay line segment 89 of FIG. 7. Therefore, the variable delay line 27 may be set to have a delay time that is less than or more than the time delay fixed in the delay line 23.

Figure 8:
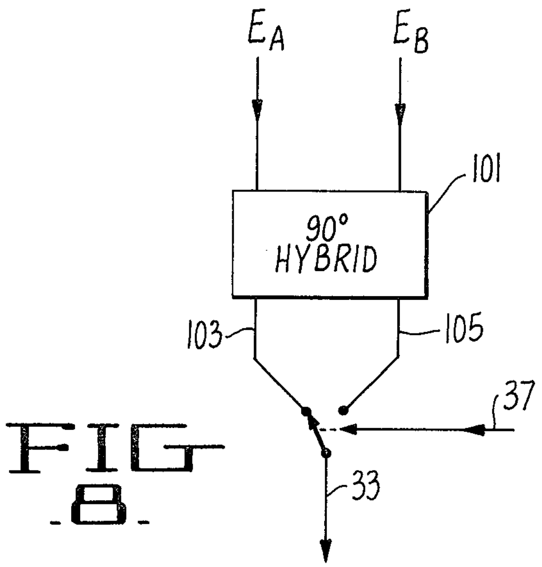
FIG. 8 illustrates an alternate signal combiner and modulator in the system of FIG. 1.

Referring to FIG. 8, a specific signal combiner and modulator 31 is shown that is similar in operation to that of FIG. 2 with $\phi = 90°$ therein. A commercially available quadrature hybrid coupler 101 receives the delayed signals $E_A$ and $E_B$ at two inputs. The hybrid 101 has two outputs 103 and 105 which are connected with a single pole, double throw switch 109. The switch 107 alternately connects the outputs 103 and 105 with the composite signal line 33. The switch 107 operates in response to the square wave switching control signal in the line 37.

The output signals at the outputs 103 and 105 of the quadrature hybrid coupler 101 are related to its input signals $E_A$ and $E_B$ in the following manner as controlled by the characteristics of the hybrid coupler:

$$E(103) = 1/\sqrt{2}(E_A + jE_B) \quad (2)$$

$$E(105) = 1/\sqrt{2}(E_B + jE_A) \quad (3)$$

Figures 9, 10, 11:
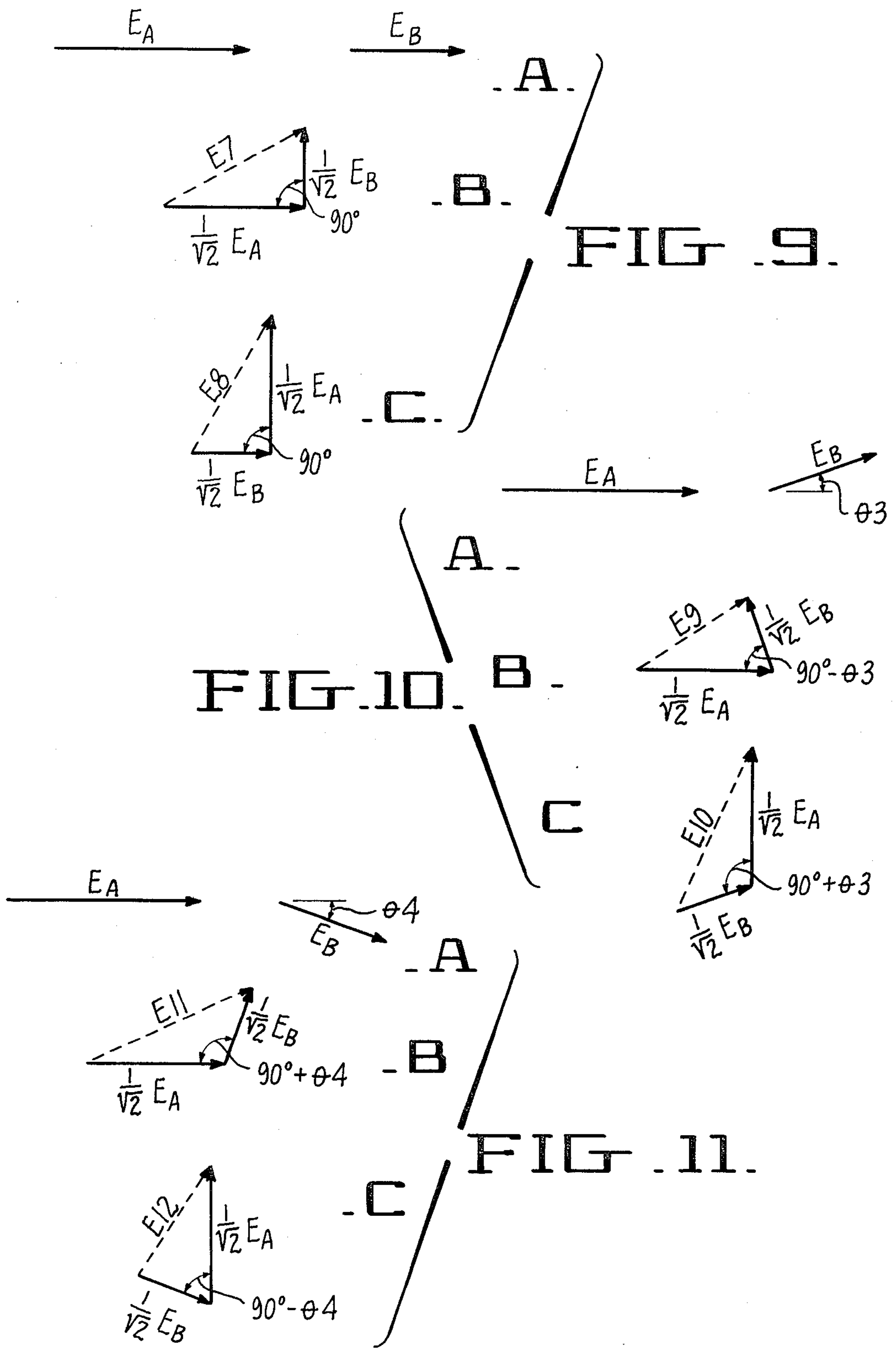
FIGS. 9A–C, 10A–C and 11A–C illustrate in vector form the operation of the signal combiner and modulator of FIG. 8.

Operation of the hybrid 101 in terms of these expressions is illustrated by the vector diagrams of FIGS. 9, 10 and 11 which are similar, respectively, to FIGS. 3, 4 and 5. The phase angle $\phi$ of FIGS. 3–5 is equal to 90° in FIGS. 9–11.

FIG. 9 shows the case where the delayed signals $E_A$ and $E_B$ are in phase but have different relative amplitudes. The resultant signal E7 is formed at the output 103 of the hybrid while the resultant signal E8 is formed at the output 105. The switch 107 alternately selects between the signals E7 and E8. It will be noted that in the situation of FIG. 9, the magnitudes of the signals E7 and E8 are equal which results in the magnitude of the amplitude modulation of the composite signal in the line 33 being zero.

FIG. 10 shows the operation of the circuit of FIG. 8 in the case where the delayed signal $E_B$ is out of phase with and leads the delayed signal $E_A$ by a phase angle $\theta$3. In this case, the output signal E9 at 103 of the hybrid is of a smaller magnitude than the output signal E10 at the output 105 of the hybrid. Therefore, the switch 107 in alternately selecting between the outputs 103 and 105 form a composite signal in the line 33, alternately switches between radio frequency amplitude levels E9 and E10. The composite signal is thus amplitude modulated.

In FIG. 11, the delayed signal $E_B$ is shown to lag in relative phase behind the delayed signal $E_A$ by an amount $\theta$4. In this case, the signal E11 at the output 103 of the hybrid is greater than the signal E12 at the output 105 of the hybrid. The result is a composite signal in the line 33 that is amplitude modulated with a different sense than in the case shown in FIG. 10.

It should be noted from the vector diagrams of FIGS. 9–11, as well as the vector diagrams previously discussed with respect to FIGS. 305, that the resultant signals which make up the composite signal in the line 33 are dependent upon the relative magnitudes of the delayed signals $E_A$ and $E_B$ as well as their relative phase angle. It is only at the condition of coincidence wherein the delayed signals $E_A$ and $E_B$ are in phase that any relative amplitude unbalance is of no importance. Thus, the technique described herein wherein the variable delay line 27 is adjusted until such a coincidence of resultant signals is obtained is preferred to a system which would directly measure the magnitudes of the resultant signals. For instance, with respect to FIG. 8, it would be possible to measure the magnitudes of the output signals 103 and 105 of the hybrid 101 without the use of the dalay lines 23 and 27 in the path of the signals $E_A$ and $E_B$. The measured difference in magnitude between the output signals at 103 and 105 would then be an indication of the phase relationship of the signals received at the antennas. However, as pointed out above, this technique suffers from the disadvantage that the measurements are also dependent upon the relative magnitudes of the signals developed at the antennas as well as their relative phases. Conversely, the techniques of the present invention are insensitive to amplitude differences in the signals developed by the individual antennas and passed through the delay lines.

Figure 12:
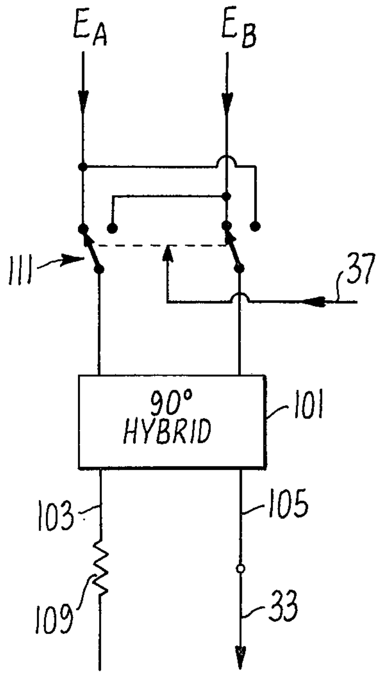
FIGS. 12 and 13 show two additional specific forms of a signal combiner and modulator in the direction finding system of FIG. 1.

Referring to FIG. 12, a modification of the circuit of FIG. 8 is shown for use of the hybrid 101. One of the outputs 103 of the hybrid is terminated in a load 109. The other output 105 is permanently connected to the line 33 for delivering the composite signal thereto. Instead of switching the output circuit, a switch 111 is provided for reversing the delayed signals $E_A$ and $E_B$ with respect to inputs of the hybrid 101. The composite signal developed in the line 33 according to FIG. 12 is the same as that developed by the circuit of FIG. 8.

Figure 13:
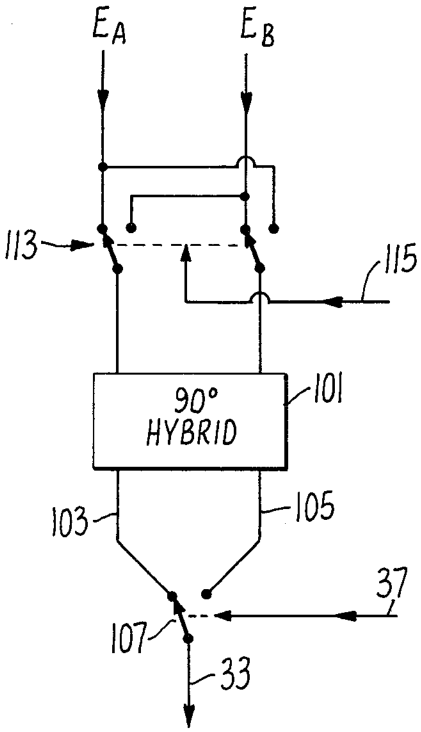

FIG. 13 shows yet another modification of FIG. 8 utilizing the quadrature hybrid coupler 101. Its outputs 103 and 105 are switched as discussed above with respect to FIG. 8. In addition, the delayed signals $E_A$ and $E_B$ are alternately reversed between the inputs to the hybrid by a double pole, double throw switch 113. The switch 113 is alternated between its two positions in response to a signal in a line 115. It is desired to operate the switch 113 in each of its two positions while the switch 107 is in each of its two positions. Therefore, the switching signal in the line 115 should have at least twice the frequency as the switching signal in the line 37. The result of this arrangement is to remove bias errors due to non-ideal amplitude and phase characteristics of the hybrid 101.

Satisfactory 90° hybrid couplers are commercially available and thus easy to employ. The 90° phase shift is also highly desirable because it combines a high percentage amplitude modulation, for a given phase difference between the delayed signals $E_A$ and $E_B$, with a high radio frequency signal strength. The phase shift angle may be other values by use of other phase shifting equipment, an angle $\phi$ of approximately 60° having been used in construction of the vector diagrams of FIGS. 3, 4 and 5, as an example. It will be noted from the vector diagrams of FIGS. 3–5 and 9–11 that the composite signal resulting from the vectorial addition of the delayed signals $E_A$ and $E_B$ is greater than the signal from a single antenna. The signal strength of the composite signal in the line 33 is a maximum at $\phi = 0°$ while the percentage modulation is zero. Conversely, the signal strength of the composite signal is a minimum for $\phi = 180°$. Therefore, $\phi = 0°$ and $\phi = 180°$ are preferably avoided in most applications. A phase angle $\phi$ value in a range of about 90° down to something greater than 0°, such as about 45°, is preferred.

For satisfying certain particular requirements, other elements may be added to those shown and described above. For instance, attenuation may be added to any of the specific embodiments described above to linearize and/or to limit the amount of modulation as a function of the setting of the variable delay line 27.

The various aspects of the present invention have been described with respect to specific preferred embodiments but it will be understood that the invention in entitled to protection within the full scope of the appended claims.

I claim:

1. A method of determining a difference in time of arrival of an electromagnetic energy wavefront at two points a fixed distance from each other, comprising the steps of:

positioning an antenna at each of the two points, delaying a signal from one of said antennas for a fixed period of time, delaying a signal from the other of the antennas for a variable period of time, combining the delayed signal from said one antenna and the delayed signal from said other antenna in a manner to form a composite signal corresponding to substantially a single electromagnetic energy wavefront frequency of interest, said composite signal being modulated an amount proportional to the phase difference between the delayed signal from said one antenna and the delayed signal from said other antenna, ajusting the period of the variable time delay of the signal from said other antenna to minimize the modulation of said composite signal, and determining the difference between said fixed period and the adjusted variable period at the minimum modulation, whereby said difference is the desired difference in time of arrival of said electromagnetic energy wavefront at said two points.

2. The method as defined by claim 1 wherein the composite electrical signal is amplitude modulated an amount proportional to the phase difference between the delayed signal from said one antenna and the delayed signal from said other antenna.

3. A method of determining a difference in time of arrival of an electromagnetic energy wavefront of a given frequency between first and second points in space, comprising the steps of:

positioning first and second electromagnetic energy receiving antennas at said first and second points, respectively, delaying an electrical signal from said first antenna for a fixed period of time, thereby to form a first delayed, signal, delaying an electrical signal from said second antenna for a period of time that is variable, thereby to form a second delayed signal, phase shifting said first delayed signal a certain amount and adding to said second delayed signal, thereby to develop a first composite signal, phase shifting said second delayed signal said certain amount and adding to said first delayed signal, thereby to develop a second composite signal, alternately applying in time sequence said first and second composite signals to a single signal detector that is tuned to select the signal of said given frequency from signals of other frequencies that may be present, developing an error signal that is proportional to any time sequential difference in output level of the detector resulting from any differences in level of said first and second composite signals, adjusting the variable delay period of time of the electrical signal from said second antenna to minimize said error signal, whereby the difference between the time delay periods of the electrical signals from the first and second antennas is the desired difference in time of arrival of the electromagnetic energy wavefront at said first and second points.

4. The method according to claim 3 wherein said certain amount of phase shift is substantially 90°.

5. The method according to claim 3 wherein said certain amount of phase shift is 90° or less.

6. A method of determining a difference in time of arrival of an electromagnetic energy wavefront of a given frequency between first and second points in space, comprising the steps of:

positioning first and second electromagnetic energy receiving antennas at said first and second points, respectively, delaying an electrical signal from said first antenna for a fixed period of time and simultaneously delaying an electrical signal received by the second antenna for a period of time that is adjustable between various known values that extend in a range from less than said fixed period of time to something greater than said fixed period of time, thereby generating a signal $E_A$ that is a signal from the first antenna delayed a fixed amount and developing a signal $E_B$ that is a signal from the second antenna having been delayed an adjustable amount, generating a first signal having an amplitude that is directly proportional to $E_A + jE_b$, generating a second signal with an amplitude directly proportional to $E_B + jE_A$, combining said first and second signals in a manner to form a composite signal that includes said given frequency and that is modulated an amount proportional to any amplitude difference between said first and second signals, and adjusting the adjustable delay time of the signal from said second antenna between said known values to minimize the modulation of said composite signal, whereby the difference in the time delay between the signals from the first antenna and the second antenna is substantially equal to the difference in time of arrival of a radio wave between said first and second points.

7. A method of determining the difference in time of arrival of a radio wavefront between first and second points in space, comprising the steps of:

positioning first and second antennas at said first and second points, respectively, producing first and second radio frequency signals whose amplitudes are proportional to the relative phase of the signals received by said first and second antennas, alternately applying said first and second radio frequency signals to a radio receiver having an automatic gain control which generates an output that is proportional to the amplitude of the radio frequency signal to its input, developing from the automatic gain control output an error signal that is proportional to the differences in amplitudes between said first and second radio frequency signals, and adjusting the relative time delays in the path of the electrical signals developed from the first and second antennas to minimize said error signal.

8. A system for determining the time delay in recepit of a radio signal at first and second antennas positioned a fixed distance apart, comprising:

means for delaying an electrical signal from said first antenna for a fixed period of time, thereby to produce a first delayed signal, means for delaying an electrical signal from said second antenna for a variable period of time, thereby to produce a second delayed signal, means receiving both of said first and second delayed signals for porducing a composite signal that is modulated by an amount related to the phase difference between said first and second delayed electrical signals, means responsive to the magnitude of modulation in the composite signal for adjusting said variable delay means until the amount of modulation of said composite signal is minimized, and means for indicating the difference in delay times between the fixed and variable delay means at said minimum modulation of the composite signal, whereby said indicated difference is the desired time delay between recepit of said radio signal at said first and second antennas.

9. The system according to claim 8 wherein said composite signal producing means includes means for producing a composite signal that is amplitude modulated by an amount proportional to the difference in phase between said first and second delayed electrical signals.

10. A system according to claim 8 which additionally comprises a radio receiver that receives said composite signal at its antenna receptacle.

11. A system for determining the time delay in receipt of a radio signal at first and second antennas positioned a fixed distance apart, comprising:

means for delaying an electrical signal from said first antenna for a fixed period of time, thereby to produce a first delayed signal, means for delaying an electrical signal from said second antenna for a variable period of time, thereby to produce a second delayed signal, said variable delay means including a plurality of delay line segments that are digitally switchable, means receiving both of said first and second delayed signals for producing a composite signal that is modulated by an amount related to the phase difference between said first and second delayed electrical signals, and means responsive to the magnitude of modulation in the composite signal for adjusting said variable delay means until the amount of modulation of said composite signal is minimized said adjusting means including a binary counter whose output is connected with said plurality of delay line segments to control the total period of delay corresponding to the count of the counter, said binary counter being driven to a count proportional to the amount of modulation of said composite signal, whereby the difference in delay times between the fixed and variable delay means after adjustment is the desired time delay between receipt of said radio signal at said first and second antennas.

12. A system according to claim 11 which additionally includes a means for displaying the output of said binary counter.

13. A system for determining a difference in time of arrival of a radio signal of a given frequency at first and second antennas positioned a fixed distance apart, comprising:

a first delay line connected to said first antenna, thereby producing a first delayed signal, a second delay line connected to said second antenna, thereby producing a second delayed signal, means for combining said first and second delayed signals to form first and second composite signals that have amplitudes which differ in proportion to a difference in relative phase between said first and second delayed signals, a signal detector that is tunable to select a signal of said given frequency from signals of other frequencies that may be present at its input, means for alternately applying in time sequence said first and second composite signals to the input of said detector, means responsive to an output of said detector for developing an error signal that is proportional to any variations in detector output level resulting from differences in level of said first and second composite signals, means responsive to said error signal for adjusting the relative time delay periods of said first and second delay lines to minimize the error signal level, whereby the difference in the time delay periods of said first and second delay lines when said amplitude modulation is minimized is equal to the desired difference in time of arrival of the given frequency radio signal at the first and second antenna positions.

14. A system according to claim 13 wherein said combining means is additonally characterized by forming the first and second composite signals with substantially equal amplitudes when said first and second delayed signals are in phase.

15. A system for determining a difference in time of arrival of a radio signal at first and second antennas positioned a fixed distance apart, comprising:

a first delay line connected to said first antenna, thereby producing a first delayed signal, a second delay line connected to said second antenna, thereby producing a second delayed signal, means for combining said first and second delayed signals to form a composite signal that is amplitude modulated an amount proportional to a difference in relative phase between said first and second delayed signals, said combining means including a switch and phase shifting circuit connected so that said composite signal thereof alternates between first and second values, said first composite signal value being said first delayed signal phase shifted by said phase shifting circuit a certain amount and added to said second delayed signal, said second composite signal level being the second delayed signal phase shifted by said phase shifting network said certain amount and added to said first delayed signal, means responsive to said composite signal for adjusting the relative time delay periods of said first and second delay lines to minimize the amount of amplitude modulation of said composite signal, whereby the difference in the time delay periods of said first and second delay lines when said amplitude modulation is minimized is equal to the desired difference in time of arrival of the radio signal at the first and second antenna positions.

16. A system for determining a difference in time of arrival of a radio signal at first and second antennas positioned a fixed distance apart, comprising:

a first delay line connected to said first antenna, thereby producing a first delayed signal, a second delay line connected to said second antenna, thereby producing a second delayed signal, means for combining said first and second delayed signals to form a composite signal that is amplitude modulated an amount proportional to a difference in relative phase between said first and second delayed signals, said combining means including a quadrature hybrid coupler and a switching network, means responsive to said composite signal for adjusting the relative time delay periods of said first and second delay lines to minimize the amount of amplitude modulation of said composite signal, whereby the difference in the time delay periods of said first and second delay lines when said amplitude modulation is minimized is equal to the desired difference in time of arrival of the radio signal at the first and second antenna positions.

17. A system according to claim 15 which additionally comprises a means for operating said switch to alternate said composite signal between said first and second values at a fixed frequency.

18. A system according to claim 17 wherein said fixed frequency is at a level that is below the lower frequency range of any modulation of said radio signal of interest, thereby not interferring with the information content of said radio signal.

19. A system according to claim 17 which additionally includes means responsive to said composite signal for selecting a narrow radio frequency band from said composite signal and for generating an error signal that is proportional to the magnitude of amplitude modulation of said composite signal.

20. A system according to claim 19 wherein said selecting means includes a radio receiver having an automatic gain control circuit generating an output signal radio frequency magnitude in said composite signal, said automatic gain control circuit output signal being used to generate said error signal.

21. A system according to claim 20 wherein said adjusting means further includes a synchronous detector responsive to said automatic gain control circuit output and further responsive to said switch operating means for forming said error signal, whereby said error signal is proportional to the difference between said first and second levels of said composite signal.

22. A system according to claim 19 wherein said adjusting means additionally includes an up/down binary counter responsive to said error signal, said counter having a digital output that is connected to at least one of said first and second delay lines in a manner to minimize said error signal.

23. A system according to claim 22 which additionally includes a means responsive to the binary output of said counter for displaying a quantity that is proportional to the difference in period of delay between said first and second delay lines.

24. A system for determining a difference in time of arrival of a radio signal at first and second antennas that are positioned a fixed distance apart, comprising, means for delaying a signal developed by said first antenna for a fixed time, means for delaying a signal developed by the second antenna for a variable period of time, a quadrature hybrid coupler for receiving the signal outputs of said fixed period delay means and said adjustable period delay means, thereby to produce first and second signals that are proportional in amplitude to the relative phases of the outputs of said delay means, a radio receiver having an antenna input terminal and an output signal level that is proportional to the radio signal input amplitude, means for alternately applying said first and second signals to the antenna input terminal of said radio receiver, means for developing an error signal that is proportional to any variations in the receiver output level resulting from differences between the amplitude of said first and second signals, and means automatically responsive to said error signal for adjusting the time delay of said variable delay means in order to minimize said error signal.

25. A method of determining a difference in time of arrival of an electromagnetic energy wavefront of a given frequency at two antennas held a fixed distance from one another, comprising the steps of:

delaying a signal from one of the antennas for a variable period of time with respect to a signal from the other of said antennas, combining the signals from the antennas after relative delays therebetween to form first and second composite signals at said given frequency that have levels which differ in proportion to a phase difference between the delayed antenna signals, said first and second composite signal levels being substantially equal when the signals from the antennas after relative delays therebetween are in phase, alternately applying in time sequence said first and second composite signals to a single signal detector that is tuned to select the signal of said given frequency from signals of other frequencies that may be present.

developing an error signal that is proportional to any variations in output level of the detector resulting from any differences in level of said first and second composite signals, adjusting the variable relative period of time delay between the antenna signals to minimize said error signal, and determining said relative period of time delay between the antenna signals at a minimum error signal, whereby said relative delay is the desired difference in time of arrival of said electromagnetic energy wavefront at said two antennas.

26. A system for determining the time delay in receipt of a radio signal at first and second antennas positioned a fixed distance apart, comprising:

means for delaying an electrical signal from said first antenna for a fixed period of time, thereby to produce a first delayed signal, means for delaying an electrical signal from said second antenna for a variable period of time, thereby to produce a second delayed signal, said variable delaying means including a plurality of delay line segments that are digitally switchable between a plurality of time periods, means receiving both of said first and second delayed signals for producing a composite signal that is modulated by an amount related to the phase difference between said first and second delayed electrical signals, means responsive to the magnitude of modulation in the composite signal for digitally switching said plurality of delay line segments until the amount of modulation or said composite signal is minimized and means for indicating the difference in delay times between the fixed and variable delay means at said minimum modulation of the composite signal, whereby said indicated difference is the desired time delay between receipt of said radio signal at said first and second antennas.

27. A system for determining a difference in time of arrival of a radio signal of a given frequency at first and second antennas positioned a fixed distance apart, comprising:

means connected to said antenna for developing a first electrical signal from the first antenna and a second electrical signal from the second antenna, said signal developing means including means for controlling the relative phase of the first and second electrical signals, means for combining said first and second signals to form first and second composite signals that have amplitudes which differ in proportion to a difference in relative phase between said first and second delayed signals, a signal detector that is tunable to select a signal of said given frequency from signals of other frequencies that may be present at its input, means for alternately applying in time sequence said first and second composite signals to the input of said detector, means responsive to an output of said detector for developing an error signal that is proportional to any variations in detector output level resulting from differences in level of said first and second composite signals, means responsive to said error signal for adjusting the relative time delay periods of said first and second delay lines to minimize the error signal level, whereby the difference in the time delay periods of said first and second delay lines when said amplitude modulation is minimized is equal to the desired difference in time of arrival of the given frequency radio signal at the first and second antenna positions.

* * * * *